US008840289B2

(12) United States Patent
Lindsay et al.

(10) Patent No.: US 8,840,289 B2
(45) Date of Patent: Sep. 23, 2014

(54) HEADLAMP LIGHT PIPE AND SIDE MARKER INTEGRATION

(75) Inventors: Brian Lindsay, Ann Arbor, MI (US); Yasuo Watanabe, Battle Creek, MI (US)

(73) Assignees: Toyota Motor Engineering & Manufacturing North America, Inc., Erlanger, KY (US); II Stanley Co., Inc., Battle Creek, MI (US)

( * ) Notice: Subject to any disclaimer, the term of this patent is extended or adjusted under 35 U.S.C. 154(b) by 354 days.

(21) Appl. No.: 12/760,064

(22) Filed: Apr. 14, 2010

(65) Prior Publication Data

US 2011/0255298 A1 Oct. 20, 2011

(51) Int. Cl.

*F21V 9/00* (2006.01)
*F21S 8/10* (2006.01)
*F21V 8/00* (2006.01)

(52) U.S. Cl.

CPC ......... *F21S 48/2237* (2013.01); *F21S 48/2287* (2013.01); *G02B 6/0006* (2013.01); *F21S 48/2268* (2013.01)

USPC ............................ 362/511; 362/507; 362/514

(58) Field of Classification Search

USPC .......... 362/511, 517, 518, 545, 541, 555, 551
See application file for complete search history.

(56) References Cited

U.S. PATENT DOCUMENTS 5,046,805 A 9/1991 Simon
5,081,564 A * 1/1992 Mizoguchi et al. ........... 362/521
5,128,839 A * 7/1992 Kato ............................ 362/521
5,537,003 A 7/1996 Bechtel et al.
5,550,716 A 8/1996 Dassanayake et al.
5,552,969 A * 9/1996 Murakami .................... 362/520
6,089,736 A * 7/2000 Tanaka .......................... 362/520
6,352,365 B1 3/2002 Healy et al.
6,547,428 B1 4/2003 Delattre
6,685,348 B2 2/2004 Pastrick et al.
7,086,765 B2 8/2006 Wehner
7,665,868 B2 * 2/2010 Sato et al. ..................... 362/373
7,837,368 B2 * 11/2010 Nakamura et al. ............ 362/544
2003/0169598 A1 * 9/2003 Imazeki et al. ............... 362/517
2004/0047161 A1 * 3/2004 Mochizuki et al. ........... 362/511
2006/0239022 A1 10/2006 Inaba et al.
2007/0258260 A1 11/2007 Valcamp et al.
2008/0002420 A1 1/2008 Lambert et al.

(Continued)

FOREIGN PATENT DOCUMENTS

EP 0675319 A1 10/1995

*Primary Examiner* — Jason Moon Han
*Assistant Examiner* — Jessica M Apenteng
(74) *Attorney, Agent, or Firm* — Gifford, Krass, Sprinkle, Anderson & Citkowski, P.C.

(57) ABSTRACT

The present invention provides a headlamp assembly including a light pipe and reflex reflector integration utilizing a single bulb to illuminate both the reflex reflector and the light pipe, simultaneously. The headlamp assembly includes a single light source, a light pipe and a reflex reflector positioned adjacent one another allowing the light source to provide light to both the reflex reflector and the light pipe. The reflex reflector includes a reflecting element and a cutout to allow light to pass though the reflex reflector into the reflecting element. The reflex reflector is adapted to transform light from white to amber thereby creating the side marker function. The headlamp assembly further includes a reflector behind the light source to direct light into the light pipe. The automotive headlamp assembly provides an automotive headlamp assembly that includes a reflex reflector light and a light pipe while reducing cost and decreasing weight.

10 Claims, 2 Drawing Sheets

30
42
40
32
24
20
22
16

(56) References Cited

U.S. PATENT DOCUMENTS

2008/0225548 A1* 9/2008 Eichelberger ................ 362/551
2009/0034277 A1* 2/2009 Okada ........................... 362/509
2009/0296416 A1 12/2009 Luo et al.

* cited by examiner

HEADLAMP LIGHT PIPE AND SIDE MARKER INTEGRATION

FIELD OF THE INVENTION

The present invention relates to an automotive headlamp assembly and, in particular, an automotive headlamp utilizing a single light source to illuminate both a side marker function and a light pipe.

BACKGROUND OF THE INVENTION

Vehicle lighting assemblies, and in particular, vehicle headlamp assemblies, are subject to numerous regulatory requirements for side marker lights. Side marker lights contribute to the general visibility of a vehicle, together with other conspicuity devices such as, daytime running lamps, parking lamps and tail lamps. Side marker lights are mandatory on all vehicles in the United States and Canada. Front mounted reflex reflectors are attached to both sides of the front fender of a vehicle. Safety regulations require the front reflex reflectors and side marker lights to be colored amber. Additionally, automotive vehicle headlamps are more frequently incorporating light pipes to add a more stylized appearance. However, reduced costs and decreased weight are two primary engineering specification requirements for automotive vehicles. Accordingly, providing an automotive headlamp assembly that includes a side marker light function and a light pipe while reducing cost and decreasing weight is particularly desirable.

SUMMARY OF THE INVENTION

The present invention provides a headlamp assembly including a light pipe and side marker integration utilizing a single incandescent bulb to illuminate both the side marker and the light pipe, simultaneously. The headlamp assembly includes a single light source, a light pipe and a reflex reflector positioned adjacent one another allowing the light source to provide for both a side marker light and a light pipe. The reflex reflector includes a reflecting element and a cutout to allow light to pass though the reflex reflector into the reflecting element. Illumination of the reflex reflector provides for the government mandated side marker function. The reflex reflector is adapted to transform light from white to amber thereby creating the side marker function. The headlamp assembly further includes a reflector behind the light source to direct light into the light pipe. The disclosed automotive headlamp assembly provides an automotive headlamp assembly which includes a reflex reflector light and a light pipe while reducing cost and decreasing weight.

DETAILED DESCRIPTION OF THE INVENTION

This invention provides a headlamp assembly including a light pipe and reflex reflector integration utilizing a single bulb to illuminate both the side marker function and the light pipe, simultaneously. A reflex reflector is incorporated into the headlamp assembly to provide for a government mandated side marker light function. The headlamp assembly includes a single light source, a light pipe and a reflex reflector positioned adjacent one another allowing the light source to provide light to both the side marker function and the light pipe. The disclosed automotive headlamp assembly provides an automotive headlamp assembly that includes a reflex reflector, side marker light and a light pipe while reducing cost and decreasing weight.

Figure 1:
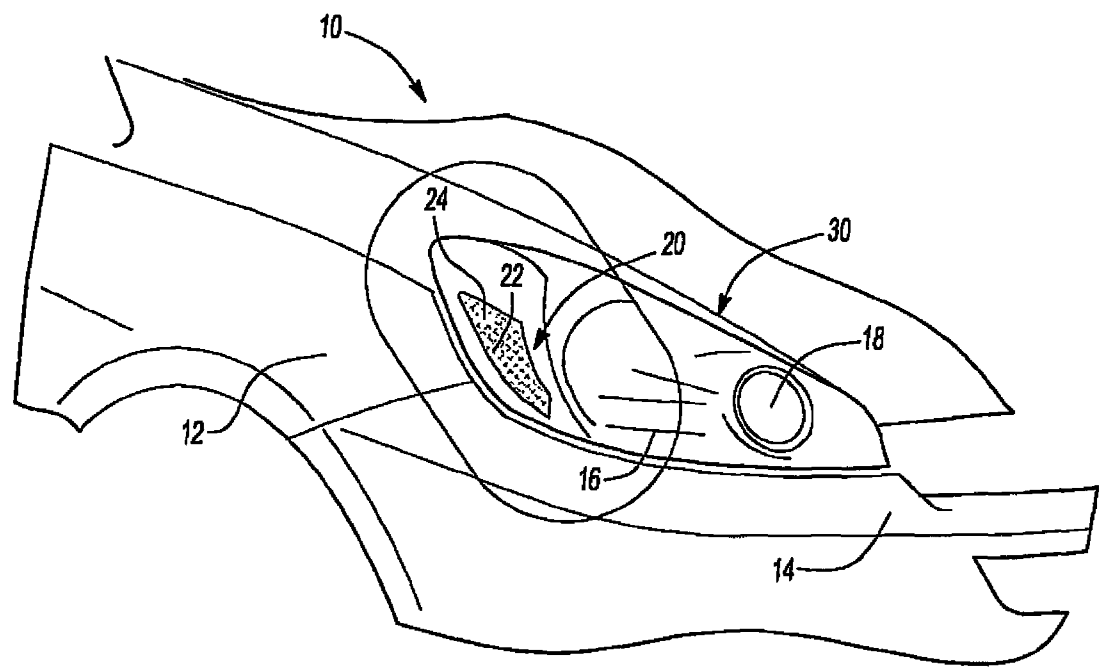
FIG. 1 is a perspective view of the front passenger side of a motor vehicle depicting a general headlamp assembly.

FIG. 1 is a perspective view of the front passenger side of a motor vehicle 10 depicting a headlamp assembly 30. The motor vehicle 10 includes a side panel 12 and a front bumper 14. In this embodiment, the headlamp assembly 30 includes a headlight 18. The headlight 18 is the primary light source for the vehicle 10. The headlamp assembly 30 further includes a lens 16. Lens 16 is transparent and colorless and wraps around the vehicle 10 to extend from the front bumper 14 to the side panel 12.

The headlamp assembly 30 includes a reflex reflector 20. Reflex reflector 20 is connected, or positioned adjacent, to the lens 16 which wraps around the vehicle 10 from the front bumper 14 to the side panel 12. The side marker function is a government mandated feature for automotive vehicles. Reflex reflector 20 further includes a reflecting element 22 which accepts light and reflects light out to illuminate the vehicle 10. The reflex reflector 20 includes a cutout window 24 wherein light from a light source is able to pass through into said reflecting element 22 enabling illumination for the side marker function. The reflex reflector 20 is amber, or orange, in color and generally transparent or translucent. Government safety regulations require the front reflex reflectors 20 and all side marker functions be colored amber.

Figure 2:
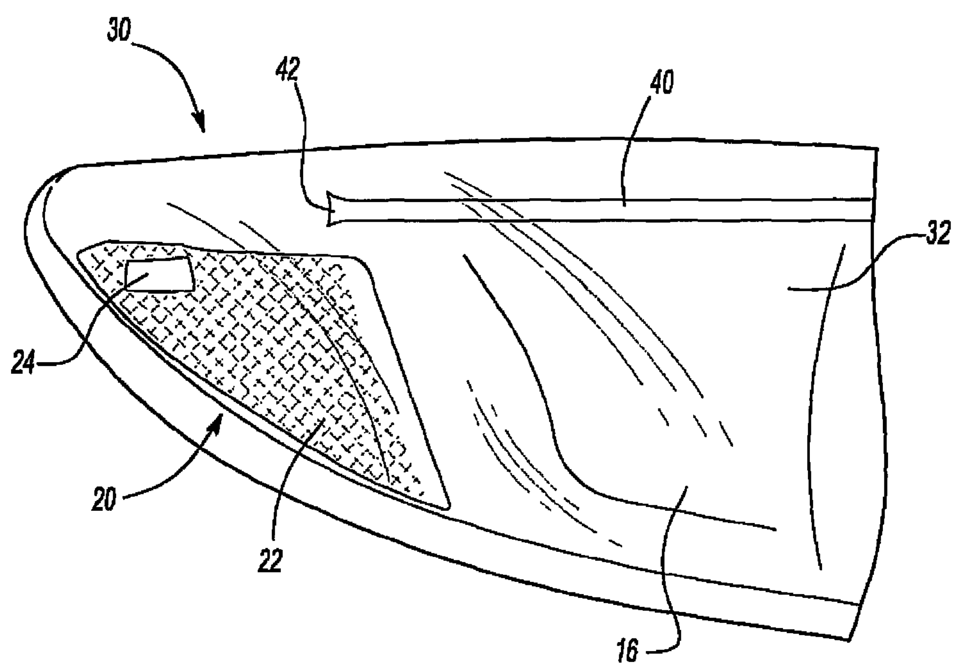
FIG. 2 depicts a front view of a headlamp assembly.

FIG. 2 depicts a front view of the headlamp assembly 30 further including a light pipe 40. Light pipe 40 is commonly used in automotive headlamp assemblies. Automotive vehicle headlamps are more frequently including light pipes to add a more stylized appearance. The light pipe 40 is comprised of an acrylic or polymeric material. The light pipe 40 is an elongated solid cylinder including a first end 42 and a second end (not pictured). Optionally, the light pipe 40 may be a hollow cylindrical tube. In this embodiment, the light pipe 40 is straight. In other embodiments, the light pipe 40 may optionally be curved.

The interior of the light pipe 40 includes a plurality of facets designed to uniformly distribute light within the light pipe 40. Each facet of light pipe 40 includes a facet surface area. Light is reflected off of the facet surface area. The facet surface area of each facet within the light pipe 40 varies in size along the length of the light pipe 40. The facet surface area of each facet is small at the first end 42 of the light pipe 40. In turn, less light is reflected off of the facet surface area of the facets at the first end 42. The facet surface areas of the facets towards the middle of the light pipe 40 have larger facet surface areas as to reflect more light. The distribution of smaller and larger facet surface areas creates an equal distribution of light throughout the light pipe 40.

Light is directed down the light pipe 40 to create the appearance of an elongated light bulb. The light pipe 40 may be positioned horizontal, as in the present embodiment, or vertical. The light pipe 40 provides an additional source of light. Additionally, the light pipe 40 creates a unique and high demand appearance for an automotive headlamp 30. A light source (See FIG. 4) directs light into the first end 42 of the light pipe 40. In this particular embodiment, numerous varying facets internal to light pipe 40 direct the light down the light pipe 40 to create a uniform output of light along the light pipe 40. This embodiment of light pipe 40 with a first end 42 creates the particularly desirable appearance of an elongated light bulb.

FIG. 2 further demonstrates the positioning of reflex reflector 20. Reflex reflector 20 includes a reflecting element 22 which accepts light and reflects light out to illuminate the vehicle 10. The reflex reflector 20 includes a cutout window 24 wherein light from a light source 44 is able to pass through the reflex reflector 20 into the reflecting element 22 transforms light from white to amber so side marker function is met. In this embodiment, the reflex reflector 20 is amber and is also transparent. The side marker function contributes to the visibility of a vehicle, together with other conspicuity devices such as, daytime running lamps, parking lamps and tail lamps. Reflex reflectors 20 are mandatory on all vehicles in the United States and Canada. Safety regulations require the side marker lights to be colored amber also. Ordinarily, the light pipe 40 and the reflex reflector 20 would each be coupled with a separate light source. However, in the present invention, the light pipe 40 and the side marker function share the same light source. The automotive headlamp assembly 30 provides an automotive headlamp assembly which includes a reflex reflector 20 and a light pipe 40 while simultaneously reducing cost and decreasing weight.

Light pipe 40 further includes a first end 42. In FIG. 2, the first end 42 is depicted having a generally bell shaped first end 42. The first end 42 may additionally be without the bell shape. The bell shape of the first end 42 provides for a greater surface area to receive light. Receiving more light in the light pipe 40 provides for a brighter overall appearance of the light pipe 40.

Lens 16 is transparent and colorless. The lens 16 wraps around the vehicle 10 to extend from the front bumper 14 to the side panel 12. The headlamp assembly 30 includes a reflex reflector 20. Reflex reflector 20 is connected to the lens 16 which wraps around the vehicle 10 from the front bumper to the side panel 12. A turn inner lens may optionally connect to, or be placed adjacent, the lens 16. The reflex reflector 20 may be connected to the lens 16 by a clip, adhesive or other connective means.

Figure 3:
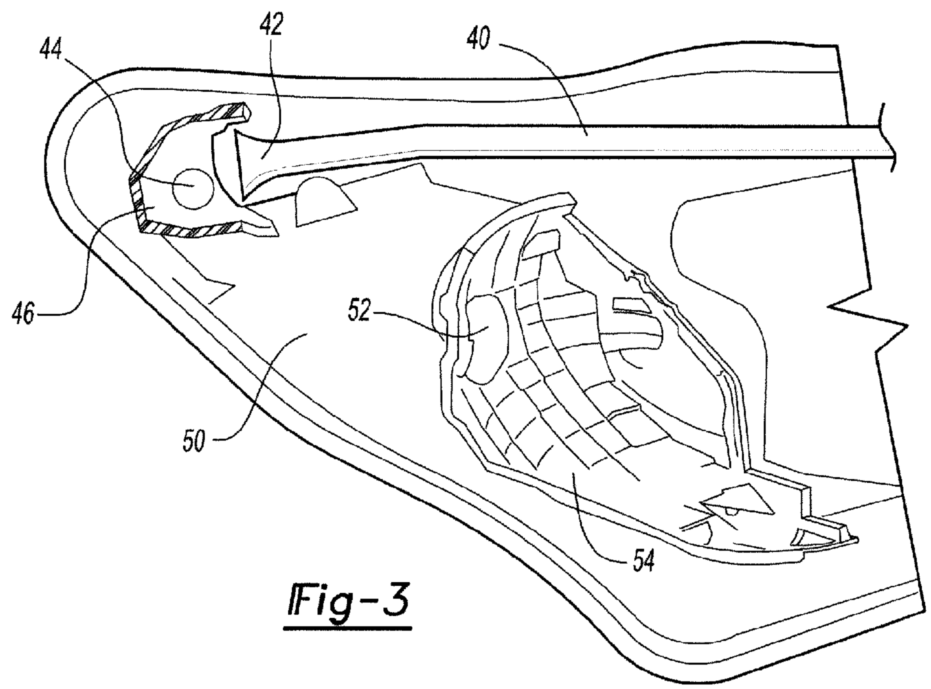
FIG. 3 shows a front view of a headlamp assembly with the extension, lens and reflex reflector removed.

FIG. 3 shows a front view of the headlamp 30 assembly with the lens 16, turn inner lens 60 and reflex reflector 20 removed. The light pipe 40 is oriented horizontally having a first end 42. Light is directed into the light pipe 40 to create the appearance of an elongated light bulb or to create the appearance of a series of light emitting diodes. A light source 44 directs light into the first end 42 of the light pipe 40.

In this particular embodiment, the light source 44 is an incandescent light bulb. Alternatively, the light source 44 may be a LED or other general light emitting source. A plurality of varying facets internal to light pipe 40 direct the light down the light pipe 40 to create a uniform output of light along the light pipe 40. When fully assembled, the light source 44 provides light to both the light pipe 40 and the reflex reflector 20.

A light source 44 directs light into the first end 42 of the light pipe 40. The light from light source 44 is more efficiently concentrated and directed into the first end 42 of the light pipe 40 by the addition of a metalized reflector 46. Metalized reflector 46 is comprised of a shiny or metallic curved surface intended to efficiently direct light from the light source 44 into the first end 42 of the light pipe 40. The metalized reflector 46 is made from an acrylic, polymeric or metallic material. The metalized reflector 46 includes a surface which is shinny or reflective in nature. Use of the metalized reflector 46 prevents lost light and creates a brighter and more efficient light pipe 40.

The light pipe 40, metalized reflector 46 and lens 16 are mounted to the housing 50. The housing 50 holds all of the parts and accessories necessary to complete the entire headlamp assembly 30. The housing 50 holds other accessories and parts not discussed in the present disclosure. The lens 16 attaches to the housing 50 by means of a clip or other retention means. The housing 50 is attached to a vehicle 10.

Figure 4:
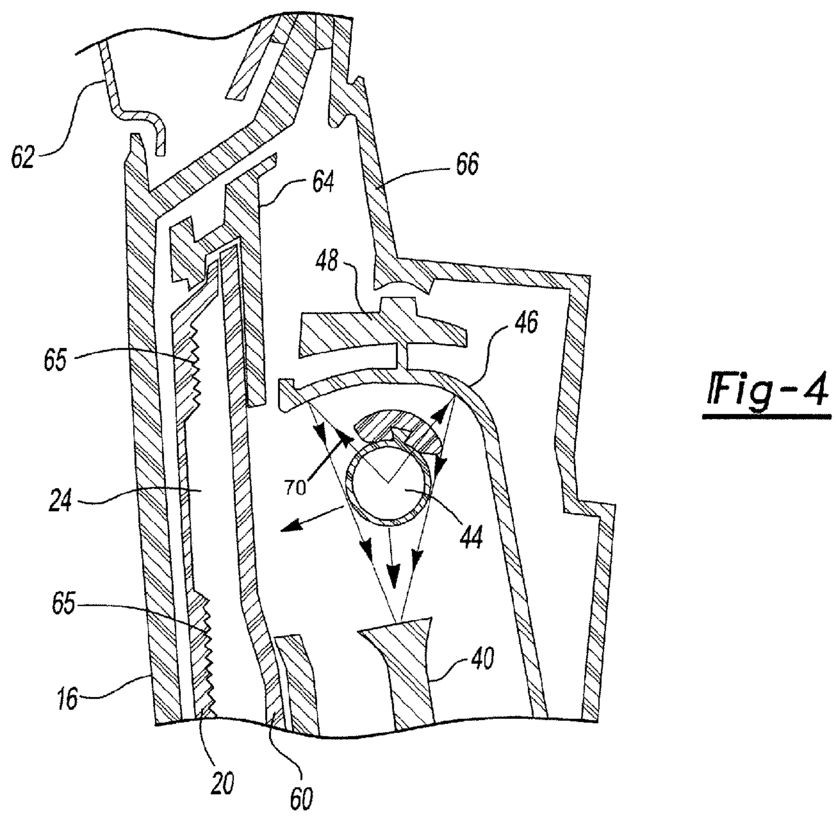
FIG. 4 depicts a cross section of the headlamp assembly.

FIG. 4 depicts a cross section of the headlamp assembly 30. FIG. 4 best demonstrates the relationship between the light source 44, the light pipe 40 and the reflex reflector 20. The light source 44, the light pipe 40 and the reflex reflector 20 are positioned adjacent one another to allow the light source 44 to provide light to the light pipe 40 and the reflex reflector 20, simultaneously. This assembly provides for an illuminated side marked function and an illuminated light pipe. This configuration of an automotive headlamp assembly provides an automotive headlamp assembly 30 that includes a reflex reflector 20 and a light pipe 40 while reducing cost and decreasing weight.

The light from light source 44 is more efficiently concentrated and directed into the first end 42 of the light pipe 40 by the addition of a metalized reflector 46. Metalized reflector 46 is comprised of a shiny or metallic curved surface intended to efficiently direct light from the light source 44 into the first end 42 of the light pipe 40. Metalized reflector 46 further includes an attachment member 48. Use of the metalized reflector 46 prevents lost light and creates a brighter and more efficient light pipe 40. Light emitting arrows 70 demonstrate the various paths of light emitting from the light source 44. Light from the light source 44 is able to pass directly through the turn inner lens 60 into the cutout window 24 and into the reflex reflector 20. Additionally, light from the light source 44 is able to pass directly into the light pipe 40 as shown by the light emitting arrows 70. Furthermore, light from the light source 44 may reflect off of the reflector 46 into the light pipe 40 or into the cutout window 24 also shown by light emitting arrows 70.

The reflex reflector 20 includes a cutout window 24 wherein light from a light source is able to pass through the reflex reflector 20 into the reflecting element 22. The cutout window 24 enables light from the light source 44 to enter the reflective area of the reflex reflector 20. The reflex reflector 20 further includes a plurality of teeth 65. The reflex reflector 20 transforms white light from the light source 44 into the government required amber color. The reflex reflector 20 therefore provides the required side marker function as required on all vehicles.

Lens 16 is transparent and colorless and wraps around the vehicle 10 to extend from the front bumper 14 to the side panel 12. The headlamp assembly 30 includes a reflex reflector 20. Reflex reflector 20 is optionally connected to the lens 16 which wraps around the vehicle 10 from the front bumper to the side panel 12. Reflex reflector 20 may optionally be connected to the turn inner lens 60. The turn inner lens 60 is optionally connected to the lens 16. The reflex reflector 20 is connected to the turn inner lens 60. The turn inner lens 60 is not essential to the operation of the headlamp assembly 30. The reflex reflector 20 may be connected to the lens 16 by a clip, adhesive or other connective means.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. An automotive lamp assembly comprising:

a light source to emit a supply of light, the light source being a single incandescent light bulb;

an elongated cylindrical light pipe having a first end and a second end, an elongated cylindrical portion of the light pipe extending between the first end and the second end of the light pipe, said first end of said light pipe spaced apart from the light source and configured to accept said supply of light from said light source to carry the supply of light from the first end to the second end of the light pipe to illuminate the light pipe, the first end of the light pipe positioned adjacent to the light source, the elongated cylindrical portion of the light pipe extending away from the light source;

a reflex reflector mounted on a side of an automotive vehicle within an automotive headlamp, the reflex reflector having a first surface, the first surface having a plurality of teeth, the first surface further including a cutout portion adjacent to the plurality of teeth, the reflex reflector spaced apart from the first end of the light pipe, the reflex reflector spaced apart from and not connected to the light pipe, the reflex reflector positioned to allow a first beam of light from the light source to pass through the reflex reflector to deliver the light to an exterior of the vehicle, the light pipe positioned to allow a second beam of light from the light source to travel down the light pipe; and wherein said light source, said light pipe and said reflex reflector are positioned adjacent one another enabling said light source to simultaneously provide light to both said light pipe and said reflex reflector.

2. The automotive lamp assembly of claim 1, wherein said automotive lamp assembly further includes a housing.

3. The automotive lamp assembly of claim 2, wherein a metalized reflector is attached to said housing to concentrate light from said light source into said first end of said light pipe.

4. The automotive lamp assembly of claim 1, wherein said reflex reflector is amber in color.

5. The automotive lamp assembly of claim 1, wherein said reflex reflector is orange in color.

6. The automotive lamp assembly of claim 1, wherein said automotive lamp assembly further includes a turn inner lens.

7. The automotive lamp assembly of claim 6, wherein said reflex reflector and said turn inner lens are affixed to an extension lens.

8. The automotive lamp assembly of claim 7, wherein said extension lens is affixed to a housing.

9. The automotive lamp assembly of claim 1, wherein said reflex reflector includes the plurality of teeth.

10. The automotive lamp assembly of claim 1, wherein said light pipe is a generally cylindrical hollow tube.

* * * * *